United States Patent [19]
Huang

[11] Patent Number: 5,781,104
[45] Date of Patent: Jul. 14, 1998

[54] PRESSURE GAUGE WITH SELF-GENERATING POWER CAPABILITY FOR A TIRE PRESSURE INDICATOR

[76] Inventor: Tien-Tsai Huang, No. 4, Lane 30, Wu-Chuan St., Pan-Chiao City, Taipei Hsien, Taiwan

[21] Appl. No.: 898,435

[22] Filed: Jul. 22, 1997

Related U.S. Application Data

[63] Continuation-in-part of Ser. No. 773,000, Dec. 23, 1996, Pat. No. 5,694,111, and a continuation-in-part of Ser. No. 806,408, Feb. 26, 1997.

[51] Int. Cl.$^6$ .................................................. B60C 23/00
[52] U.S. Cl. .................. 340/442; 340/447; 340/539; 340/445; 73/146.5; 73/146.4; 310/318
[58] Field of Search ................ 340/447, 455, 340/442, 539, 443, 626, 445; 73/146.5, 146.2, 146.4, 146.3, 146.8; 116/34 R; 200/61.22, 61.25; 137/227, 231; 310/314, 318

[56] References Cited

U.S. PATENT DOCUMENTS

| | | | |
|---|---|---|---|
| 4,235,184 | 11/1980 | Schiavone | 340/443 |
| 4,975,679 | 12/1990 | Ballyns | 73/146.5 |
| 5,329,200 | 7/1994 | Zaitsu | 310/318 |
| 5,573,610 | 11/1996 | Koch et al. | 340/447 |
| 5,694,111 | 12/1997 | Huang | 340/447 |

*Primary Examiner*—Jeffery A. Hofsass
*Assistant Examiner*—Anh La
*Attorney, Agent, or Firm*—Oblon, Spivak, McClelland, Maier & Neustadt, P.C.

[57] ABSTRACT

A pressure gauge is used with a receiver device of a tire pressure indicator for indicating the pressure condition in a pneumatic tire, and includes a casing formed with an aperture and adapted to be mounted on the tire such that pressure in the tire enters into the casing via the aperture, and a signal generating device disposed in the casing and capable of transmitting wirelessly a pressure signal to be received by the receiver device when the pressure in the tire is not within a predetermined normal operating pressure range. A power supplying device in the casing supplies electric power for operating the signal generating device, and includes a self-generating voltage unit which has a piezoelectric unit and an impact unit that is capable of continuously striking against the piezoelectric unit when the tire to which the casing is mounted is in motion so as to enable the piezoelectric unit to generate a voltage output, a rechargeable cell unit, and a rectifying-and-charging unit which interconnects the self-generating voltage unit and the rechargeable cell unit to permit charging of the rechargeable cell unit with the voltage output from the self-generating voltage unit.

14 Claims, 10 Drawing Sheets

PRESSURE GAUGE WITH SELF-GENERATING POWER CAPABILITY FOR A TIRE PRESSURE INDICATOR

CROSS-REFERENCE TO RELATED APPLICATION

This is a continuation-in-part (CIP) of co-pending U.S. patent application Ser. No. 08/773,000 filed on Dec. 23, 1996, now U.S. Pat. No. 5,694,111 and a continuation in part of co-pending U.S. patent application Ser. No. 08/806,408 filed on Feb. 26, 1997, the entire disclosures of which are incorporated herein by reference.

BACKGROUND OF THE INVENTION

1. Field of the Invention

The invention relates to a tire pressure indicator, more particularly to a pressure gauge with a self-generating power capability for a tire pressure indicator.

2. Description of the Related Art

U.S. Pat. No. 5,289,161 discloses a pressure gauge of a tire pressure indicator which includes a casing having a hollow adaptor to be attached to a pneumatic tire, an aperture and a finger piece for opening an inflating valve of the tire. Pushing means, such as a diaphragm, is disposed inside the casing adjacent to the aperture and is movable, in response to pressure in the tire, between a first position in which the pressure is below a predetermined low pressure limit and a second position in which the pressure is above a predetermined high pressure limit. A spring-loaded push rod is mounted movably inside the casing and is moved by the pushing means. A signal transmitting unit is provided inside the casing and has first and second switch devices which are controlled by the movement of the push rod. The first switch device activates the signal transmitting unit to transmit a first code when the pushing means is in the first position. The second switch device activates the signal transmitting unit to transmit a second code when the pushing means is in the second position. A receiver device of the tire pressure indicator receives the first and second codes transmitted by the signal transmitting unit of the pressure gauge for indicating the pressure condition of the tire.

In co-pending U.S. patent application Ser. No. 08/773,000 filed on Dec. 23, 1996, the Applicant disclosed a pressure gauge of a tire pressure indicator which includes a casing having a hollow adaptor to be attached to a pneumatic tire, an aperture and a finger piece for opening an inflating valve of the tire, and a signal generating device disposed in the casing. The signal generating device includes a pressure sensing unit which generates an analog voltage signal that varies in accordance with pressure in the tire, a signal converting unit for converting the analog voltage signal into a digital output signal, and an encoder unit for comparing the digital output signal of the signal converting unit with high pressure and low pressure limits of a predetermined normal operating pressure range, and for generating a coded signal which includes the digital output signal when the digital output signal is not within the operating pressure range. A signal transmitter circuit transmits the coded signal from the encoder unit wirelessly for reception by a receiver device of the tire pressure indicator.

In co-pending U.S. patent application Ser. No. 08/806,408 filed on Feb. 26, 1997, the Applicant disclosed a pressure gauge of a tire pressure indicator which includes a casing formed with an aperture and to be mounted on a metal wheel of a pneumatic tire such that pressure in the tire enters into the casing via the aperture and such that the casing is concealed by the tire, and a signal generating device disposed in the casing. The signal generating device wirelessly transmits a pressure signal to be received by a receiver device of the tire pressure indicator when the pressure in the tire is not within a predetermined normal operating pressure range.

Since the receiver devices of the tire pressure indicators described beforehand may be built as a part of an instrument panel of a vehicle or as a separate device to be installed in the driver room of the vehicle, the power source of the vehicle can be used as the power source for the receiver devices. However, since the pressure gauges of the aforementioned tire pressure indicators are mounted on the tires of the vehicle, battery cells are used as the power source for the pressure gauges. The need to replace the battery cells when they run out of power in order to ensure proper operation of the pressure gauges inconveniences the owner of the vehicle.

SUMMARY OF THE INVENTION

Therefore, the object of the present invention is to provide a pressure gauge with a self-generating power capability for a tire pressure indicator to obviate the need to replace battery cells as required in the aforementioned pressure gauges.

Accordingly, the pressure gauge of this invention is adapted to be used with a receiver device of a tire pressure indicator for indicating the pressure condition in a pneumatic tire, and comprises:

- a casing formed with an aperture and adapted to be mounted on the pneumatic tire such that pressure in the pneumatic tire enters into the casing via the aperture;
- a signal generating device disposed in the casing and capable of transmitting wirelessly a pressure signal to be received by the receiver device when the pressure in the pneumatic tire is not within a predetermined normal operating pressure range; and
- a power supplying device disposed in the casing and connected electrically to the signal generating device so as to supply electric power for operating the signal generating device, the power supplying device including a self-generating voltage unit which has a piezoelectric unit and an impact unit that is capable of continuously striking against the piezoelectric unit when the pneumatic tire to which the casing is mounted is in motion so as to enable the piezoelectric unit to generate a voltage output, a rechargeable cell unit, and a rectifying-and-charging unit which interconnects the self-generating voltage unit and the rechargeable cell unit to permit charging of the rechargeable cell unit with the voltage output from the self-generating voltage unit.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
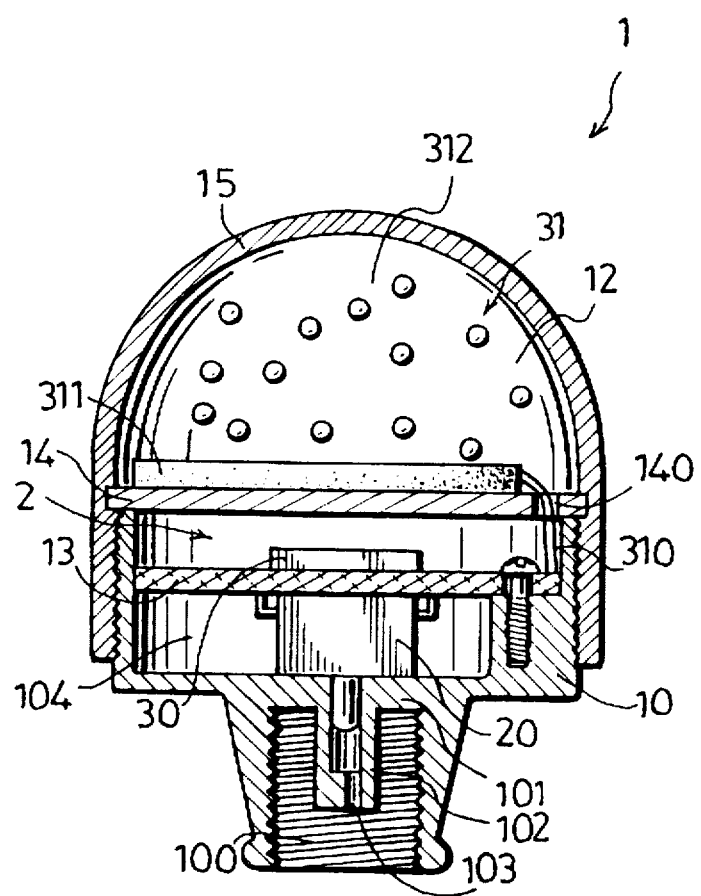
FIG. 1 is a sectional view of the first preferred embodiment of a pressure gauge with a self-generating power capability according to the present invention.

Referring to FIG. 1, the first preferred embodiment of a pressure gauge 1 according to the present invention is adapted for use with a receiver device 4 (see FIG. 3) of a tire pressure indicator for indicating the pressure condition of a pneumatic tire (not shown), and is adapted to be attached to the tire. The pressure gauge 1 comprises a casing having a hollow adaptor 10 and a cap 15, and a signal generating device 2 disposed in the adaptor 10. The pressure gauge 1 is a modification of the pressure gauge disclosed in the aforementioned co-pending U.S. patent application Ser. No. 08/773,000, the entire disclosure of which is incorporated herein by reference.

The adaptor 10 has a first open end 100 which is threaded internally for connection with an inflating valve of the tire in a conventional manner. A transverse partition plate 101 extends adjacent to the first open end 100 of the adaptor 10, and is formed with a downwardly extending tubular finger piece 102 to open the inflating valve of the tire when the adaptor 10 is mounted on the latter. The finger piece 102 is formed with an aperture 103 to permit the entry of air from the tire into the adaptor 10. The cap 15 has a round closed end and an internally threaded open end which is coupled threadedly with a second open end 104 of the adaptor 10. A transverse partition plate 14 is mounted in the cap 15 and abuts against the second open end 104 of the adaptor 10. The partition plate 14 and the cap 15 cooperatively confine a chamber 12 therebetween.

Figure 2:
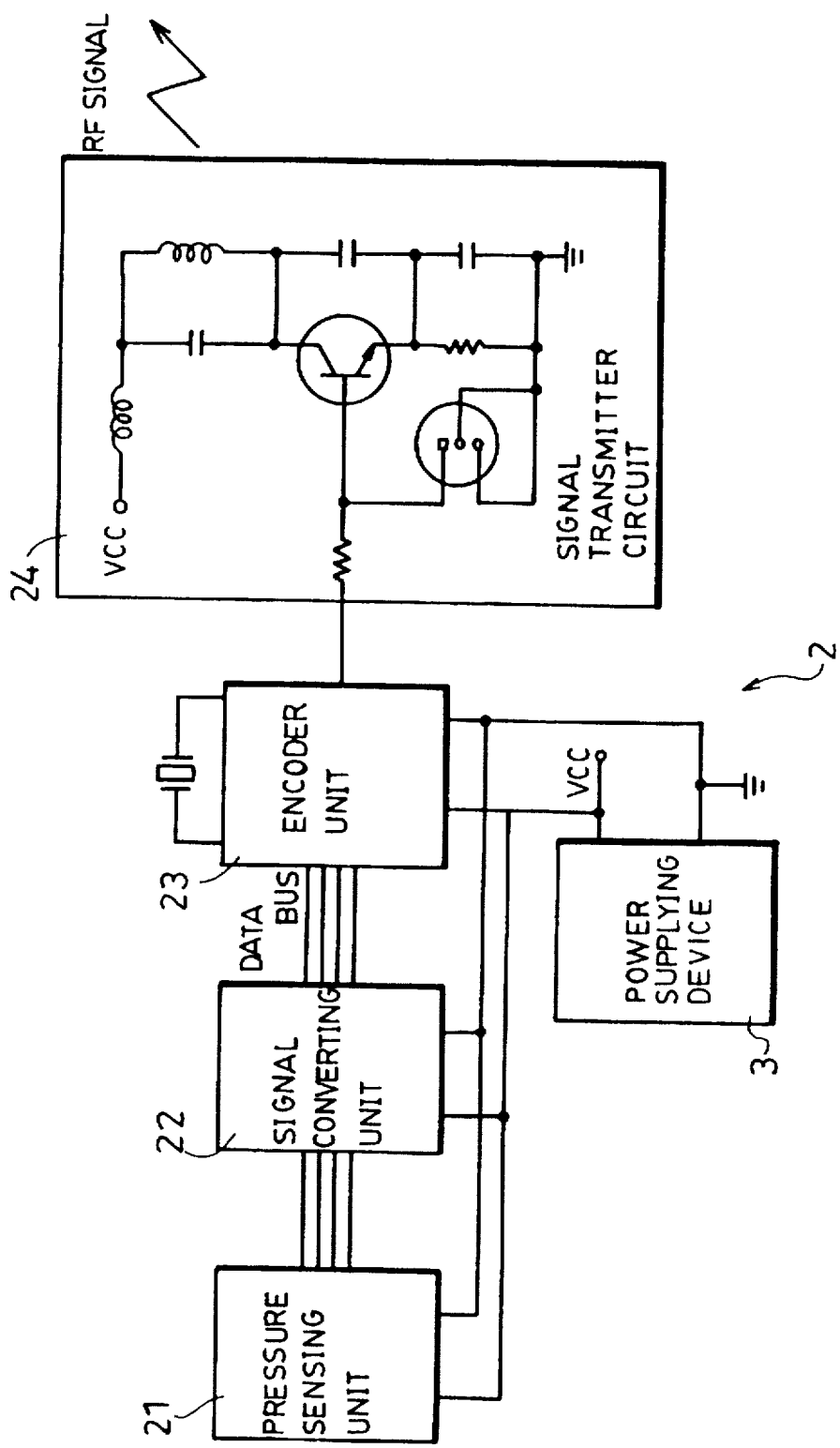
FIG. 2 is a schematic circuit block diagram of a signal generating device of the pressure gauge shown in FIG. 1.

The signal generating device 2 includes a circuit board 13 mounted in the second open end 104 of the adaptor 10. As shown in FIGS. 1 and 2, the signal generating device 2 further includes a pressure sensing unit 21, a signal converting unit 22, an encoder unit 23 and a signal transmitter circuit 24 mounted on the circuit board 13.

The pressure sensing unit 21 includes a pressure sensor 20, preferably a semiconductor pressure sensor, such as the ADP1 DIP type pressure sensor manufactured by Matsushita Electric Works under the brand name NAIS. As shown in FIG. 1, the pressure sensor 20 is mounted on a bottom side of the circuit board 13 and extends into the finger piece 102. The pressure sensor 20 generates an analog voltage signal which varies in accordance with the pressure entering into the finger piece 102.

Referring once more to FIG. 2, the signal converting unit 22 is connected electrically to the pressure sensing unit 21 and serves to convert the analog voltage signal of the latter into a digital output signal. The encoder unit 23 is connected electrically to the signal converting unit 22 and receives the digital output signal of the latter. The encoder unit 23 compares the digital output signal of the signal converting unit 22 with low pressure and high pressure limits of a predetermined normal operating pressure range. The encoder unit 23 generates a pressure signal which includes the digital output signal and an identification code unique to the pressure gauge 1 when the digital output signal is not within the operating pressure range. Preferably, no pressure signal is generated when the digital output signal is between the low pressure and high pressure limits, indicating that the pressure entering into the finger piece 102 is within the operating pressure range. The signal transmitter circuit 24 is connected electrically to the encoder unit 23 and receives the pressure signal therefrom. The signal transmitter circuit 24 transmits the pressure signal wirelessly in the form of a radio frequency (RF) signal for reception is by the receiver device 4 (see FIG. 3) of the tire pressure indicator.

Figure 3:
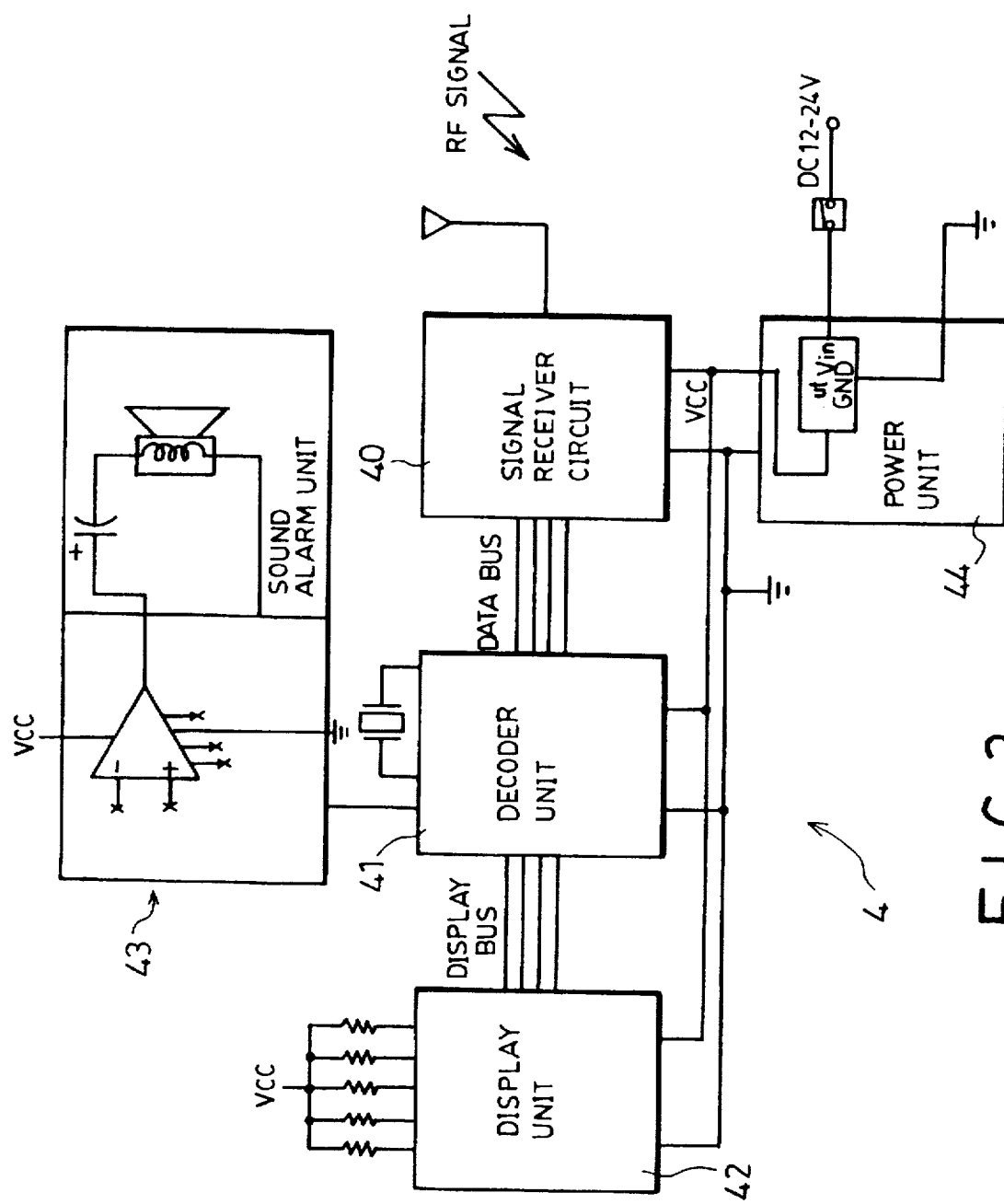
FIG. 3 is a schematic circuit block diagram of a receiver device for the pressure gauge of FIG. 1.

As shown in FIG. 3, the receiver device 4 may be built as a part of the instrument panel of a vehicle or as a separate device to be installed in the driver room of the vehicle, and provides information to the driver concerning the pressure condition of the tire to which the pressure gauge 1 is mounted. The receiver device 4 includes a signal receiver circuit 40, a decoder unit 41 connected electrically to the signal receiver circuit 40, a display unit 42 connected electrically to the decoder unit 41, a sound alarm unit 43 connected electrically to the decoder unit 41, and a power unit 44.

The signal receiver circuit 40 receives and demodulates the RF signal transmitted by the pressure gauge 1, and provides the same to the decoder unit 41. The display unit 42 is controlled by the decoder unit 41 so as to indicate thereon whether the tire to which the pressure gauge 1 is mounted is under- or over-inflated and the pressure inside the under- or over-tire. The sound alarm unit 43 is controlled by the decoder unit 41 so as to generate an audible alarm output for informing the driver of the vehicle when the tire is under- or over-inflated. The power unit 44 is connected to a 12–24 volt DC battery of the vehicle, and supplies the electric power required by the receiver device 4.

Figure 4:
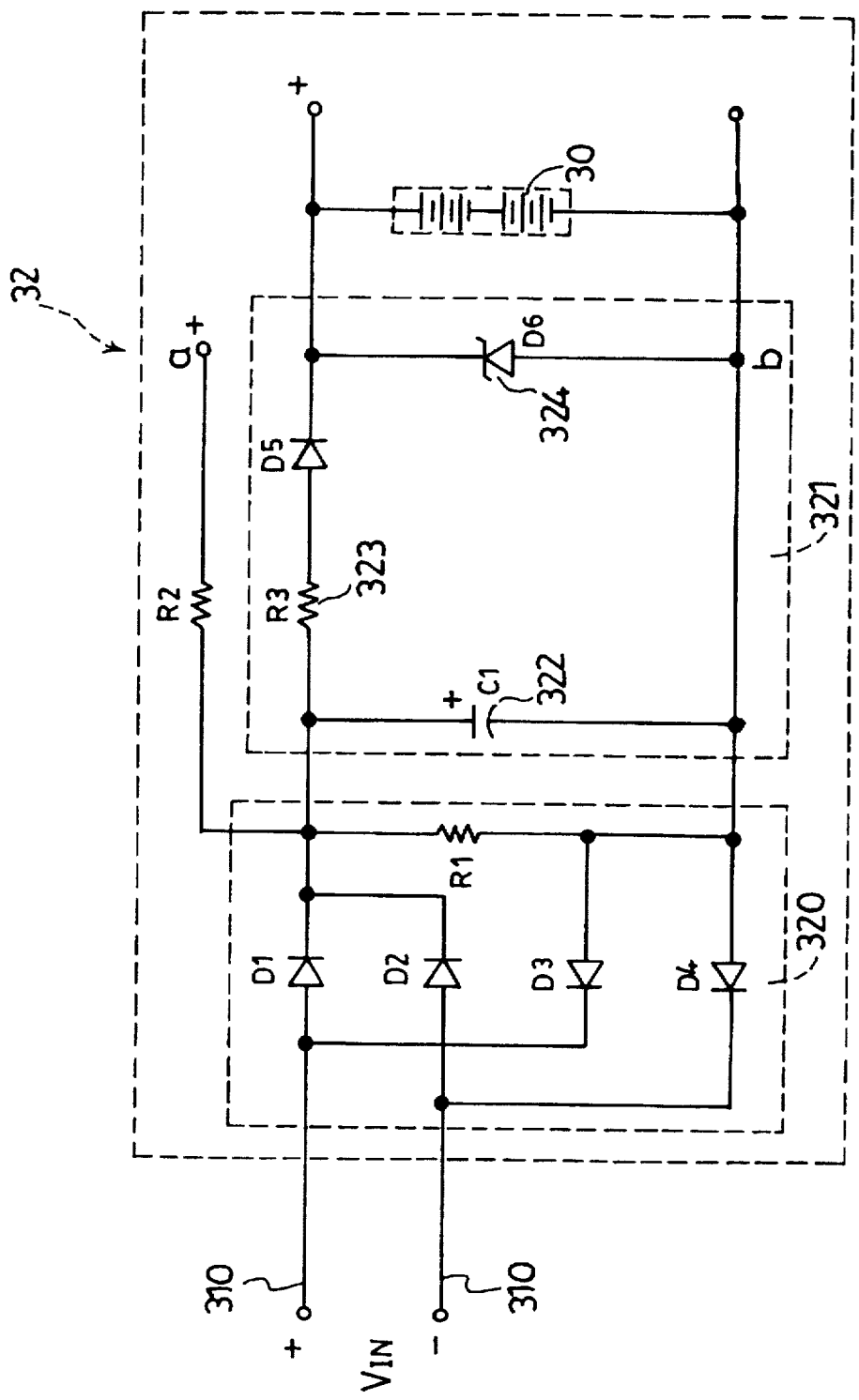
FIG. 4 is a schematic circuit diagram of a rectifying-and-charging circuit of a power supplying device of the pressure gauge of FIG. 1.

Referring to FIGS. 1, 2 and 4, a power supplying device 3 supplies the electric power required to operate the signal generating device 2. Unlike the power source of the pressure gauge disclosed in the aforementioned co-pending U.S. patent application Ser. No. 08/773,000, the power supplying device 3 comprises a rechargeable cell unit 30 mounted on a top side of the circuit board 13 (see FIG. 1), a self-generating voltage unit 31 (see FIG. 1), and a rectifying-and-charging unit 32 (see FIG. 4).

As shown in FIG. 1, the self-generating voltage unit 31 is disposed in the chamber 12 of the casing and includes a piezoelectric unit 311 and an impact unit 312. Preferably, the piezoelectric unit 311 is made of piezoelectric ceramics and is mounted on top of the partition plate 14 in the chamber 12. The partition plate 14 is formed with a through-hole 140 to permit passages of electrical wires 310 from the piezoelectric unit 311 therethrough. The wires 310 extend into the second open end 104 of the adaptor 10 for electrical connection with the rectifying-and-charging unit 32 (see FIG. 4). The impact unit 312 includes a plurality of metal balls in the chamber 12. In this embodiment, between ten to twenty steel balls are disposed in the chamber 12. As such, when the tire to which the pressure gauge 1 is mounted is in motion, the impact unit 312 continuously strikes against the piezoelectric unit 311, thereby enabling the latter to generate an alternating current (ac) voltage output that is supplied to the rectifying-and-charging unit 32.

The rectifying-and-charging unit 32 is mounted on the circuit board 13 in the second open end 104 of the adaptor 10, and interconnects the self-generating voltage unit 31 and the rechargeable cell unit 30 to permit charging of the latter with the voltage output from the self-generating voltage unit 31. Referring to FIG. 4, the rectifying-and-charging unit 32 comprises a full-wave rectifier circuit 320 and a charging circuit 321. The rectifier circuit 320 includes four diodes D1–D4 and is connected to the electrical wires 310 from the piezoelectric unit 311. The rectifier circuit 320 converts the voltage output from the piezoelectric unit 311 into a direct current (dc) voltage signal. The charging circuit 321 interconnects the rectifier circuit 320 and the rechargeable cell unit 30, and includes a voltage storing member 322, a current limiter 323 and a protective member 324. The voltage storing member 322 is in the form of a capacitor (c1) which is charged by the rectifier circuit 320. The current limiter 323 includes a limiting resistor (R3) and a diode (D5), and serves to limit the amount of current flowing from the rectifier circuit 320 to the rechargeable cell unit 30. The protective member 324 is in the form of a zener diode (D6) which is connected across the rechargeable cell unit 30 to limit the voltage across the latter so as to prevent possible damage to the signal generating device 2 due to overvoltage of the rechargeable cell unit 30.

In use, when the voltage across nodes (a), (b) of the rectifying-and-charging unit 32 is approximately 0 volt, the rectifying-and-charging unit 32 enters into a sleep mode where the rectifying-and-charging unit 32 consumes less than six milliamperes of current. Thus, when the tire is not in motion, the self-generating voltage unit 31 does not generate a voltage output, and the rectifying-and-charging unit 32 consumes a minimum amount of power to result in efficient use of energy stored in the rechargeable cell unit 30.

Figure 5:
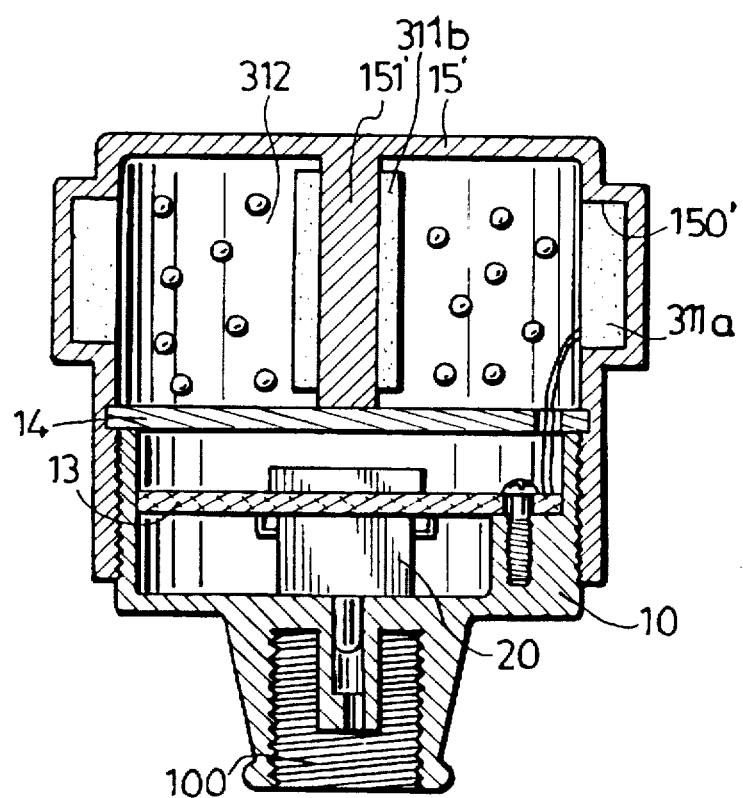
FIG. 5 is a sectional view of the second preferred embodiment of a pressure gauge according to the present invention.

The configuration of the self-generating voltage unit 31 should not be limited to that shown in FIG. 1. Referring to FIG. 5, which illustrates the second preferred embodiment of a pressure gauge according to the present invention, the cap 15' of the casing of the pressure gauge has a surrounding wall with an inner surface that is formed with an annular receiving groove 150', and an axially extending post 151' that extends toward the partition plate 14. The piezoelectric unit includes an annular first piezoelectric member 311a fitted in the receiving groove 150', and a tubular second piezoelectric member 311b sleeved on the post 151' and connected to the first piezoelectric member 311a. Like the previous embodiment, the impact unit 312 includes a plurality of metal balls in the chamber 12. Due to the modified configuration of the piezoelectric unit, the impact area between the piezoelectric unit and the impact unit 312 is increased to strengthen, in turn, the voltage output of the piezoelectric unit.

Figure 6:
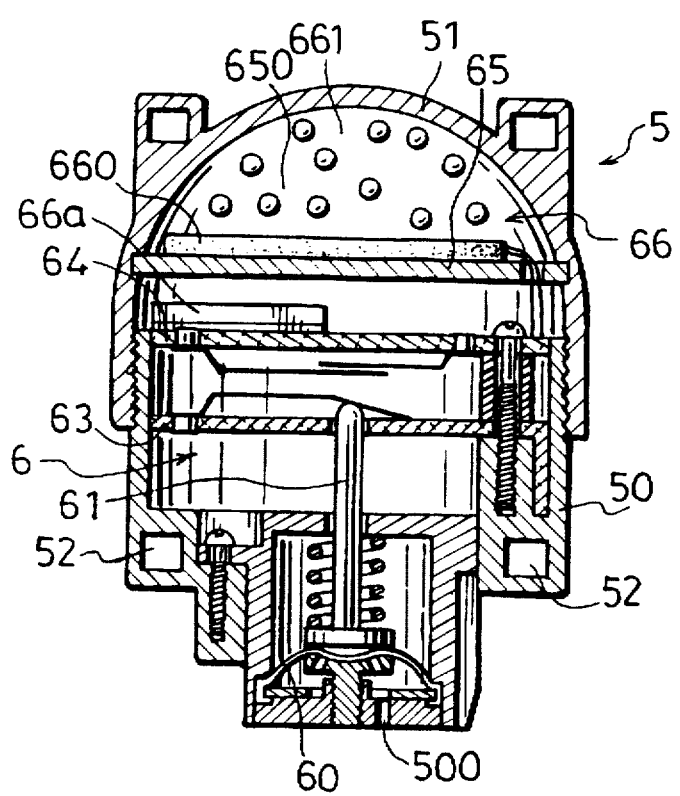
FIG. 6 is a sectional view of the third preferred embodiment of a pressure gauge according to the present invention.
Figure 8:
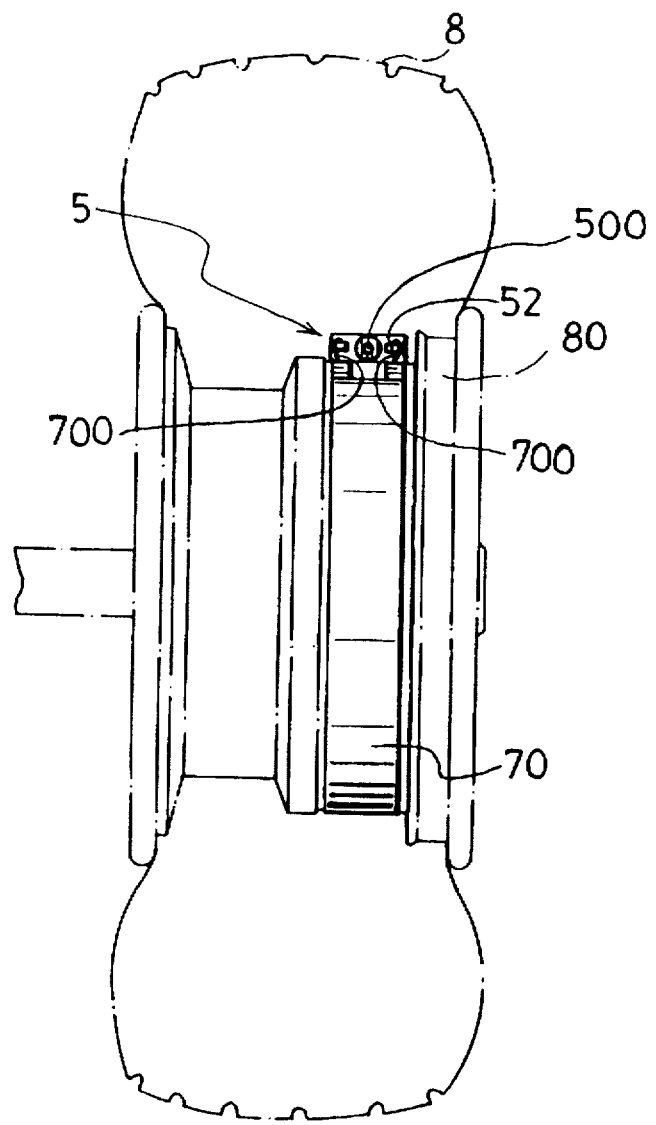
FIG. 8 is a schematic view illustrating the pressure gauge of FIG. 6 when secured to the metal wheel of the pneumatic tire.

In addition, the signal generating device of the pressure gauge according to this invention should not be limited to one which uses a semiconductor pressure sensor 20, as taught in the embodiments of FIGS. 1 to 5. Referring to FIG. 6, which illustrates a pressure gauge 5 for a tire pressure indicator according to the third preferred embodiment of the present invention, the signal generating device 6 may instead employ a mechanical pressure sensing unit. The pressure gauge 5 is a modification of the pressure gauge disclosed in the aforementioned co-pending U.S. patent application Ser. No. 08/806,408, the entire disclosure of which is incorporated herein by reference. As shown in FIGS. 6 and 8, the pressure gauge 5 is adapted to be mounted on a metal wheel 80 of a pneumatic tire 8, and comprises a casing having a hollow base 50 and a cap 51, the signal generating device 6 being disposed in the casing.

The hollow base 50 has a first end formed with an aperture 500 to permit the entry of the pressure in the tire 8 into the hollow base 50. The cap 51 has a round closed end and an internally threaded open end which is coupled threadedly with an open second end of the hollow base 50. The signal generating device 6 includes a diaphragm 60 disposed inside the casing adjacent to the aperture 500 and movable, in response to the pressure in the tire, between a first position in which the pressure is below a predetermined low pressure limit and a second position in which the pressure is above a predetermined high pressure limit. A spring-loaded push rod 61 is mounted movably inside the casing and is moved by the diaphragm 60. The signal generating device 6 further includes first and second switch devices 63, 64 which are controlled by the movement of the push rod 61. The first switch device 63 is active so that the signal generating device 6 transmits a first code unique to the pressure gauge 5 when the diaphragm 60 is in the first position. The second switch device 64 is active so that the signal generating device 6 transmits a second code unique to the pressure gauge 5 when the diaphragm 60 is in the second position. A receiver device (not shown) of the tire pressure indicator receives the first and second codes transmitted by the signal generating device 6, and indicates whether the tire 8 to which the pressure gauge 5 is mounted is under- or overinflated. Details of the signal generating device 6 and the receiver device can be found in U.S. Pat. No. 5,289,161 and will not be described further.

Figure 7:
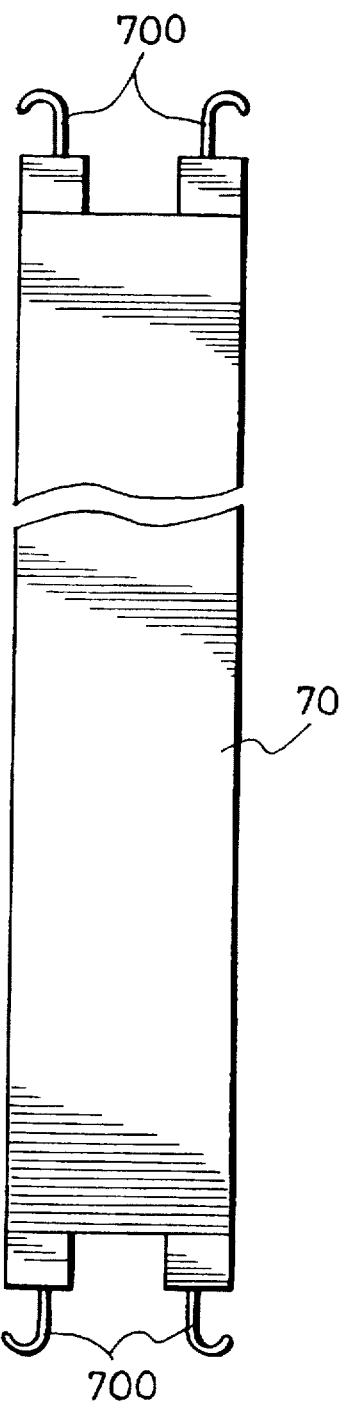
FIG. 7 illustrates an elastic strap used to secure the pressure gauge of FIG. 6 to a metal wheel of a pneumatic tire.

Each of the first end of the hollow base 50 and the closed end of the cap 51 is formed with a pair of retaining holes 52. Referring to FIGS. 7 and 8, the pressure gauge 5 is secured on the metal wheel 80 of the tire 8 by means of an elastic strap 70 which extends around the metal wheel 80, thereby concealing the pressure gauge 5 in the tire 8. The elastic strap 70 has opposite ends formed with a pair of hook units 700 which engage the retaining holes 52 in the casing of the pressure gauge 5 for securing the latter on the metal wheel 80.

Referring again to FIG. 6, as with the first preferred embodiment, a transverse partition plate 65 is mounted in the cap 51 and abuts against the open end of the hollow base 50. The partition plate 65 and the cap 51 cooperatively confine a chamber 650 therebetween. A power supplying device, similar to that employed in the first preferred embodiment, supplies the electric power required to operate the signal generating device 6. Therefore, unlike the power source of the pressure gauge disclosed in the aforementioned co-pending U.S. patent application Ser. No. 08/806,408, the power supplying device in this embodiment comprises a rechargeable cell unit 66a mounted on a top side of a circuit board of the second switch device 64, a self-generating voltage unit 66, and a rectifying-and-charging unit (not shown) similar to that of the first preferred embodiment.

As shown in FIG. 6, the self-generating voltage unit 66 is disposed in the chamber 650 of the casing and includes a piezoelectric unit 660 and an impact unit 661. When the tire to which the pressure gauge 5 is mounted is in motion, the impact unit 661 continuously strikes against the piezoelectric unit 660, thereby enabling the latter to generate an alternating current (ac) voltage output. The structure and operation of the self-generating voltage unit 66 16, are similar to that of the first preferred embodiment and will not be described further.

Figure 9:
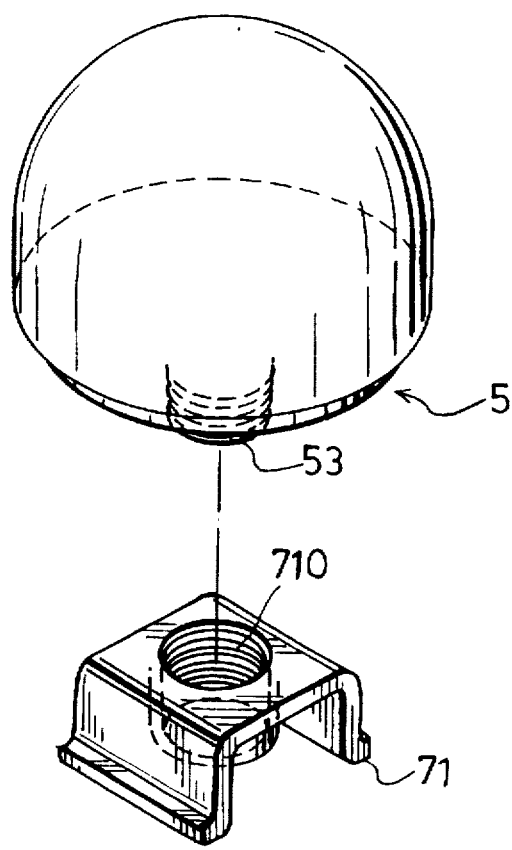
FIG. 9 is a partly exploded view illustrating a casing and a coupling seat of the fourth preferred embodiment of a pressure gauge according to the present invention.
Figure 10:
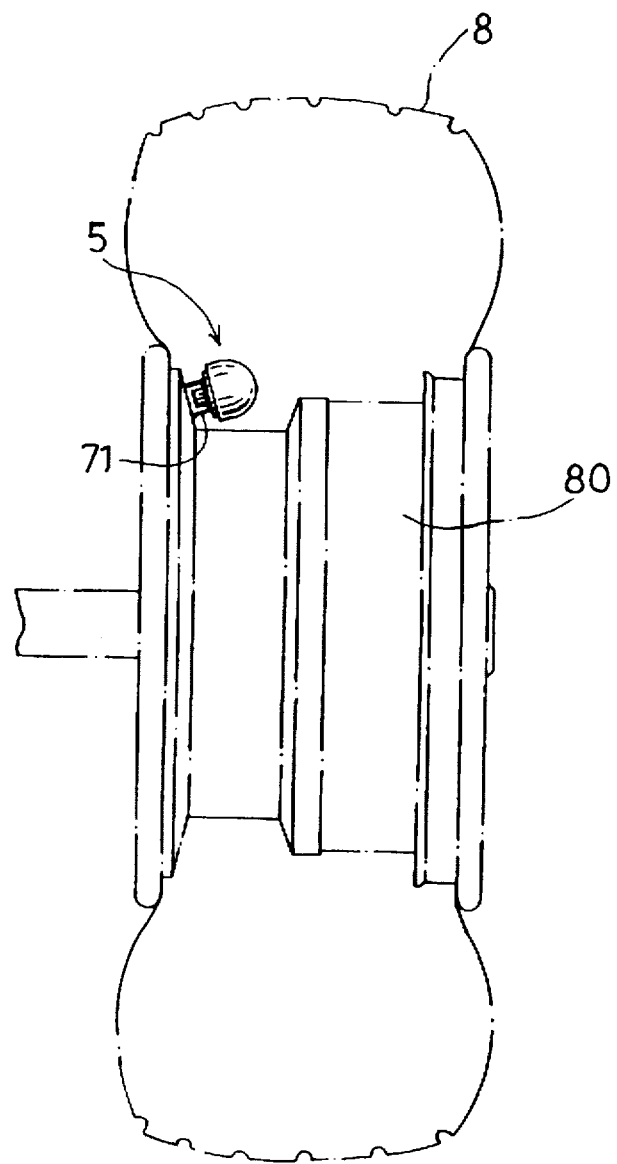
FIG. 10 is a schematic view illustrating how the coupling seat secures the casing of FIG. 9 to a metal wheel of a pneumatic tire.

The method of securing the pressure gauge 5 on the metal wheel 80 should not be limited to the elastic strap 70 used in the preceding embodiment. As shown in FIGS. 9 and 10, the casing of the pressure gauge 5 of the embodiment shown in FIGS. 6 to 8 is modified by providing the same with an externally threaded coupling tube 53 that is in fluid communication with the aperture (not shown). A coupling seat 71 is formed with an internally threaded hole 710 for engaging the coupling tube 53 and is welded onto the metal wheel 80, e.g. on a rim flange of the latter, such that the bottom ends of the coupling tube 53 and the coupling seat 71 form a clearance with the metal wheel 80 to permit entry of the pressure in the pneumatic tire 8 into the aperture of the casing of the pressure gauge 5 via the coupling tube 53.

Since the pressure gauge of this invention is capable of generating power when the tire to which it is mounted is in motion, the possibility that the pressure gauge will run out of power can be eliminated to ensure proper operation of the pressure gauge without causing any inconvenience to the owner of the vehicle. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A pressure gauge adapted to be used with a receiver device of a tire pressure indicator for indicating pressure condition of a pneumatic tire, said pressure gauge comprising:
   a casing formed with an aperture and adapted to be mounted on the pneumatic tire such that pressure in the pneumatic tire enters into said casing via said aperture;
   a signal generating device disposed in said casing and capable of transmitting wirelessly a pressure signal to be received by the receiver device when the pressure in the pneumatic tire is not within a predetermined normal operating pressure range; and
   a power supplying device disposed in said casing and connected electrically to said signal generating device so as to supply electric power for operating said signal generating device, said power supplying device including a self-generating voltage unit which has a piezoelectric unit and an impact unit that is capable of continuously striking against said piezoelectric unit when the pneumatic tire to which said casing is mounted is in motion so as to enable said piezoelectric unit to generate a voltage output, a rechargeable cell unit, and a rectifying-and-charging unit which interconnects said self-generating voltage unit and said rechargeable cell unit to permit charging of said rechargeable cell unit with said voltage output from said self-generating voltage unit.

2. The pressure gauge of claim 1, wherein said piezoelectric unit is made of piezoelectric ceramics.

3. The pressure gauge of claim 1, wherein said impact unit comprises a plurality of metal balls in said casing.

4. The pressure gauge of claim 1, wherein said rectifying-and-charging unit comprises a rectifier circuit which converts said voltage output of said piezoelectric unit into a direct current voltage signal, and a charging circuit which interconnects said rectifier circuit and said rechargeable cell unit.

5. The pressure gauge of claim 4, wherein said charging circuit comprises a voltage storing member which is charged by said rectifier circuit.

6. The pressure gauge of claim 4, wherein said charging circuit comprises a current limiter for limiting amount of current flowing from said rectifier circuit to said rechargeable cell unit.

7. The pressure gauge of claim 4, wherein said charging circuit comprises a protective member which is connected across said rechargeable cell unit to limit voltage across said rechargeable cell unit.

8. The pressure gauge of claim 1, wherein said signal generating device comprises:
   a pressure sensing unit which generates an analog voltage signal that varies in accordance with the pressure entering said aperture;
   a signal converting unit connected electrically to said pressure sensing unit for converting the analog voltage signal into a digital output signal;
   an encoder unit connected electrically to said signal converting unit, said encoder unit comparing the digital output signal of said signal converting unit with high pressure and low pressure limits of the normal operating pressure range, said encoder unit generating said pressure signal which includes the digital output signal when the digital output signal is not within the normal operating pressure range; and
   a signal transmitter circuit connected electrically to said encoder unit for transmitting the pressure signal from said encoder unit wirelessly.

9. The pressure gauge of claim 8, wherein said pressure sensing unit of said signal generating device includes a semiconductor pressure sensor that extends into said aperture.

10. The pressure gauge of claim 8, wherein said pressure signal generated by said encoder unit further includes an identification code unique to said pressure gauge.

11. The pressure gauge of claim 1, further comprising an elastic strap which is adapted to be extended around a metal wheel of the pneumatic tire so as to secure said casing on the metal wheel such that said pressure gauge is concealed by the pneumatic tire.

12. The pressure gauge of claim 11, wherein said elastic strap has opposite ends that are provided with hook units, and said casing is formed with retaining holes for engaging said hook units on said elastic strap.

13. The pressure gauge of claim 1, wherein said casing is provided with an externally threaded coupling tube, said pressure gauge further comprising a coupling seat which is formed with an internally threaded hole for engaging said coupling tube and which is adapted to be mounted on a metal wheel of the pneumatic tire so as to secure said casing on the metal wheel such that said pressure gauge is concealed by the pneumatic tire.

14. The pressure gauge of claim 13, wherein said coupling tube is in fluid communication with said aperture in said casing, and said coupling seat has a bottom end which forms a clearance with the metal wheel to permit entry of the pressure in the pneumatic tire into said aperture of said casing via said coupling tube.

* * * * *